April 2, 1935.  W. L. SWANSON  1,996,218
BIB COUPLING
Filed June 26, 1934

INVENTOR,
Wilbur L. Swanson,
BY Howard P. Smith.
His ATTORNEY

Patented Apr. 2, 1935

1,996,218

UNITED STATES PATENT OFFICE 1,996,218

BIB COUPLING

Wilbur L. Swanson, Dayton, Ohio

Application June 26, 1934, Serial No. 732,495

4 Claims. (Cl. 285—143)

This invention relates to new and useful improvements in hose bib couplings.

It is one of the principal objects of my invention to provide quick and easy means for connecting one end of a garden hose to a hose bib or faucet on the wall of a building. Frequently such a bib is surrounded by shrubbery, making it difficult to extend the hand to the bib to screw the end of a hose thereon. There are times, too, when the faucet is so close to a brick or a stone wall that in screwing a threaded hose coupling onto the faucet, one is apt to scratch one's hand against the wall.

My coupling is constructed in such a manner as to avoid the above difficulties. Attached to the bib is a male coupling member which need not be removed, but which will depend therefrom to receive a snap-on female coupling member secured to the hose. The female coupling member is brought easily in position for snap-on attachment to the male coupling member, from which it may just as easily be removed.

It is another object of my invention to provide a bib coupling that is extremely simple and economical to make, comprising but two pieces.

Other important and incidental objects will be brought out in the following specification and particularly set forth in the subjoined claims.

Figure 1:
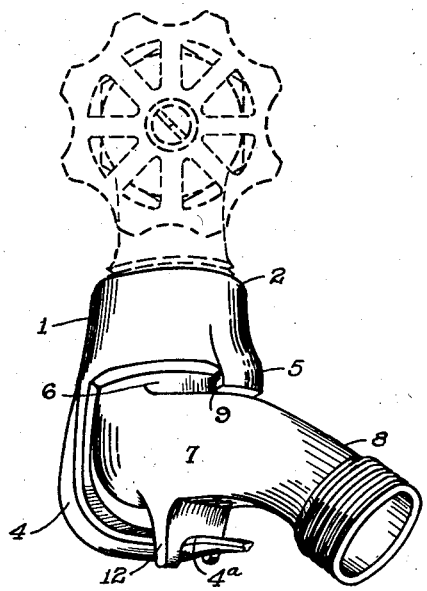
Figure 2:
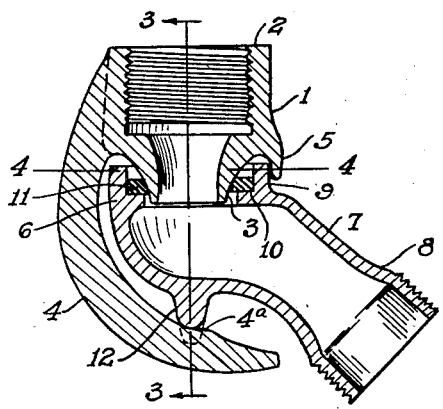
Figure 3:
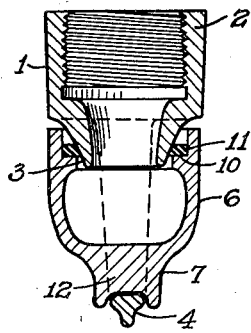
Figure 4:
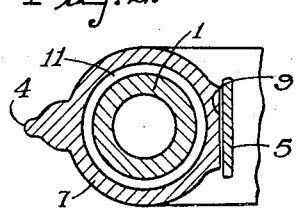

In the accompanying drawing illustrating my invention, Figure 1 is a perspective view of my two coupling members secured together, the male member being secured to a bib shown in dotted lines. Figure 2 is a longitudinal sectional view taken through the connected coupling members. Figure 3 is a sectional view taken through the same on the line 3—3 of Figure 2. And Figure 4 is a sectional view taken on the line 4—4 of Figure 2.

Referring to the accompanying drawing for a detailed description of my invention, the numeral 1 designates a male coupling member which may be cast from suitable metal. This casting 1 comprises a cup-shaped portion 2 having a bottom which tapers inwardly into a downwardly projecting tubular part 3. The cup-shaped portion of the casting is internally threaded for attachment to a bib or faucet shown in dotted lines in Figure 1.

Curving downwardly and inwardly from one side of the cup-shaped portion of the casting 1, is a finger 4. On its lower, inner surface this finger is formed with a hump 4ª that is well below the tubular projection 3. From the opposite side of said cup-shaped portion of the casting a short wing lug 5 extends outwardly and downwardly to a horizontal plane slightly above that in which the lower end of the tubular projection 3 lies.

Adapted to be forced easily and quickly between the finger 4 and the wing lug 5 of the male member 1, is the bowl shaped part 6 of a female coupling member 7 which has an inclined tubular extension 8 that is externally threaded for attachment to the end of a hose not shown. For engagement with the wing lug 5, the bowl-shaped part 6 of the female coupling member 7 is formed with a straight shoulder 9. The wing lug acts as a fulcrum for engagement by this shoulder 9 when a down pressure is exerted upon the inclined portion 8 of the female member, to force the bowl 6 upwardly around the tubular projection 3 on the male coupling member 1.

Formed on the interior surface of the bowl 6, a short distance below its top portion, is an annular shoulder 10 to receive a washer 11 which is adapted to resiliently engage the tapered tubular projection 3 when the bowl is forced upwardly around it. Projecting downwardly from the bottom of the bowl is a stud 12, which is preferably a flat, wide integral projection having a recessed lower end to straddle the curved finger 4 on the male coupling member 1.

When it is desired to use my coupling, the male coupling member 1 is attached to a hose bib or faucet by screwing it onto the same as shown in Figure 1. The female coupling member 2, after being attached at its threaded end to a garden hose for example, is then brought to a position wherein the shoulder 9 is in engagement with the wing lug 5 and the stud 12 straddles the finger 4. An inward and downward pressure is then exerted upon the lower end of the female member 7, whereupon, with the wing lug 5 acting as a fulcrum and the finger 4 as a guide, the bowl 6 will carry the washer 11 upwardly into tight engagement with the tapered periphery of the tubular projection 3 on the male member 1 to form a sea-tight connection between the two coupling members.

While the bowl portion 6 of the female coupling member 7 is being forced upwardly, the stud 12 will travel up the finger 4 past the hump 4ª, which will hold the coupling members in seal-tight engagement until they are disconnected. A slight outward and upward pull upon the lower end of the female coupling member 7 is sufficient to move the stud over the hump on the finger to disconnect these members so that the hose may be uncoupled from the hose bib.

Having described my invention, I claim:

1. A bib coupling comprising a male coupling member having a cup portion threaded for attachment to a hose bib, a tubular part projecting downwardly from the bottom of said cup portion, a curved finger projecting downwardly and inwardly from one side of said cup portion to a point below said tubular part, a short projection on the other side of said cup portion, and a female member having a guiding part straddling said finger for entrance between the latter and said projection to receive said tubular part.

2. A bib coupling comprising a male coupling member having a cup portion threaded for attachment to a hose bib, a tubular part projecting downwardly from the bottom of said cup portion, a curved finger projecting downwardly and inwardly from one side of said cup portion to a point under said tubular part, a short projection on the other side of said cup portion, a female member having a bowl portion and a guiding part straddling said finger, for entrance between the latter and said projection to bring said bowl portion over said tubular part, and a projection on said finger for engagement with said guiding part of the female member to hold said male and female members in a coupled position.

3. A bib coupling comprising a male coupling member having a cup portion threaded for attachment to a hose bib, a tapered tubular part projecting downwardly from the bottom of said cup portion, a curved finger projecting downwardly and inwardly from one side of said cup portion to a point below said tubular part, a wing lug projecting downwardly from the other side of said cup portion, a female coupling member, a washer in the upper, open end of said female member, and a recessed guiding stud projecting downwardly from said female coupling member to straddle said finger, said finger adapted to guide the female member, after one side thereof is in engagement with said wing lug, to a position to bring its upper, open end over said tapered tubular part of the male member, to force said washer into seal-tight engagement therewith when a downward pressure is exerted upon the lower end of the female member.

4. A bib coupling comprising a male member having a cup portion threaded for attachment to a hose bib, a tapered tubular part projecting downwardly from the bottom of said cup portion, a curved finger projecting downwardly and inwardly from one side of said cup portion to a point below said tubular part, a wing lug projecting downwardly from the other side of said cup portion, a female coupling member, a washer in the upper, open end of said female member, a recessed guiding stud projecting downwardly from said female coupling member to straddle said finger, said finger adapted to guide the female member, after one side thereof is in engagement with said wing lug, to a position to bring its upper, open end over said tapered, tubular part of the male member to force said washer into seal-tight engagement therewith, and a hump on the lower end of said finger behind which said recessed stud is adapted to be snapped to hold said male and female coupling members in a coupled position.

WILBUR L. SWANSON.